(12) United States Patent
Otsuka

(10) Patent No.: US 6,300,646 B1
(45) Date of Patent: Oct. 9, 2001

(54) SHEET-LIKE MEMBER PROCESSING APPARATUS AND METHOD OF HANDLING SHEET-LIKE MEMBER

(75) Inventor: Yuzuru Otsuka, Minamiashigara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/558,337

(22) Filed: Apr. 26, 2000

(30) Foreign Application Priority Data

Apr. 26, 1999 (JP) .................................................. 11-118691

(51) Int. Cl.⁷ .................................................. G03B 42/02
(52) U.S. Cl. .............................................. 250/589; 250/590
(58) Field of Search .................................. 250/584, 585, 250/588, 589, 590

(56) References Cited

U.S. PATENT DOCUMENTS

| | | | |
|---|---|---|---|
| 5,095,209 | * 3/1992 | Tamura | 250/589 |
| 5,233,555 | * 8/1993 | Aonuma | 250/588 |
| 5,530,259 | * 6/1996 | Arakawa | 250/584 |
| 5,665,976 | * 9/1997 | Arakawa | 250/588 |
| 5,736,746 | * 4/1998 | Furutoh | 250/589 |
| 5,818,065 | * 10/1998 | Exelmans | 250/588 |

* cited by examiner

Primary Examiner—Trong Phan
(74) Attorney, Agent, or Firm—Sughrue, Mion, Zinn, Macpeak & Seas, PLLC

(57) ABSTRACT

While radiation image information recorded in a first stimulable phosphor sheet removed from a cassette which is loaded in a cassette loading region is being read by a reading unit, a second stimulable phosphor sheet in a cassette loaded in a cassette loading region is attracted by a suction cup of a vertically movable sheet feeder, and removed from the cassette so that its leading edge is gripped by a feed roller pair. Immediately after the radiation image information has been read from the first stimulable phosphor sheet, the second stimulable phosphor sheet can quickly be fed to the reading unit.

7 Claims, 5 Drawing Sheets

SHEET-LIKE MEMBER PROCESSING APPARATUS AND METHOD OF HANDLING SHEET-LIKE MEMBER

BACKGROUND OF THE INVENTION

1. Field of the Invention

The present invention relates to a sheet-like member processing apparatus having a plurality of loading regions loaded with cassettes storing sheet-like members and a single movable sheet feeder for removing the sheet-like member from one of the cassettes loaded in the respective loading regions, and a method of handling a sheet-like member in such a sheet-like member processing apparatus.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display device such as a CRT or the like.

When a radiation energy such as X-rays, α-rays, γ-rays, electron beams, ultraviolet radiation, or the like is applied to a certain phosphor, it stores part of the applied radiation energy. When stimulating light such as visible light is subsequently applied to the phosphor, the phosphor emits light depending on the stored radiation energy. Such a phosphor is referred to as a stimulable phosphor. A stimulable phosphor is usually used in the form of a sheet which is referred to as a stimulable phosphor sheet (sheet-like member).

The above known system includes an image information reading apparatus (sheet-like member processing apparatus) which comprises a reading unit for reading image information recorded on a stimulable phosphor sheet, and an erasing unit for erasing remaining image information from the stimulable phosphor sheet after the recorded image information has been read. In the image information reading apparatus, a cassette housing a stimulable phosphor sheet which bears radiation image information of a subject recorded by an external exposure device is inserted into a loading region, or a plurality of such cassettes are inserted into respective loading regions.

Thereafter, the lid of the cassette is opened, and then the stimulable phosphor sheet is taken out of the cassette by a sheet feeding mechanism. The stimulable phosphor sheet is delivered to the reading unit by a sheet delivering mechanism. In the reading unit, the recorded image information is read from the stimulable phosphor sheet, and then remaining image information is erased from the stimulable phosphor sheet in the erasing unit, after which the stimulable phosphor sheet is placed into the cassette which has been disposed in the loading region.

Image information reading apparatus which have a plurality of loading regions also have a movable sheet feeder vertically movable into alignment with a desired one of the loading regions. When the movable sheet feeder is positioned in alignment with the cassette in a desired one of the loading regions, a sheet feeding mechanism such as suction cups or the like of the movable sheet feeder removes the stimulable phosphor sheet from the cassette into the image information reading apparatus.

After a stimulable phosphor sheet is removed from one of the cassettes by the movable sheet feeder, the recorded image information is read from the stimulable phosphor sheet, and then remaining image information is erased from the stimulable phosphor sheet, which is then delivered back into the cassette. While the stimulable phosphor sheet is thus being processed, the unprocessed stimulable phosphor sheets need to wait in the other cassettes loaded in the respective loading regions. Therefore, a considerable wait time is required to be consumed until a next unprocessed stimulable phosphor sheet starts being processed after the processing of the preceding stimulable phosphor sheet has ended. For this reason, the conventional image information reading apparatus with plural loading regions have a relatively low sheet processing capability per unit time.

SUMMARY OF THE INVENTION

It is a major object of the present invention to provide a sheet-like member processing apparatus which is capable of efficiently processing sheet-like members stored in cassettes loaded respectively in a plurality of loading regions for an increased sheet processing capability per unit time, and a method of handling a sheet-like member in such a sheet-like member processing apparatus.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Figure 1:
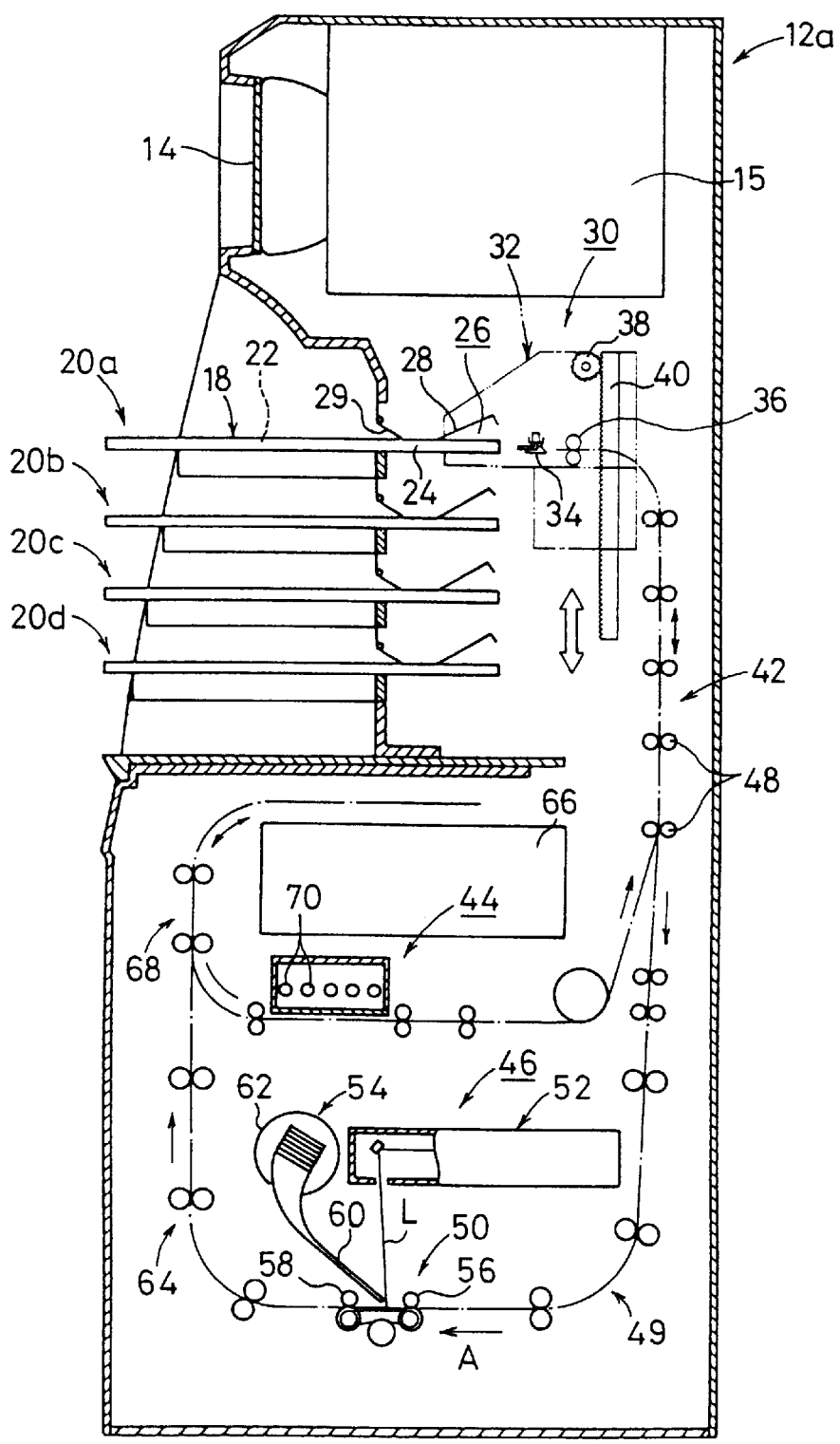
FIG. 1 is a schematic vertical cross-sectional view of an image information reading apparatus which carries out a method of handling a sheet-like member according to the present invention.

FIG. 1 shows in schematic vertical cross section an image information reading apparatus (sheet-like member processing apparatus) 12 which carries out a method of handling a sheet-like member according to the present invention.

As shown in FIG. 1, the image information reading apparatus 12 has an apparatus housing 12a including a front wall (control wall) which supports on its upper portion a touch panel 14 that functions as controls and a display monitor. The apparatus housing 12a houses a controller 15 behind the touch panel 14 for controlling operation of the image information reading apparatus 12 according to the method of handling a sheet-like member according to the present invention. The apparatus housing 12a accommodates therein a plurality of, e.g., four, cassette loading regions 20a through 20d for removably holding respective cassettes 18, disposed below the touch panel 14.

Each of the cassettes 18 comprises a casing 24 for housing a stimulable phosphor sheet (sheet-like member) 22, and a lid 28 by which an opening 26 in the casing 24 is openably closed. The cassette 18 has a lock means (not shown) for locking the lid 28 in a closed position on the casing 24.

A vertically movable sheet feeder 30 is vertically movably disposed behind the cassette loading regions 20a through 20d. The vertically movable sheet feeder 30 can selectively be aligned with any one of the cassette loading regions 20a through 20d for removing a stimulable phosphor sheet 22 from the cassette 18 in the corresponding one of the cassette loading regions 20a through 20d and returning a stimulable phosphor sheet 22 from which radiation image information is read and erased back into the cassette 18. The vertically movable sheet feeder 30 has a vertically movable base 32 on which there are mounted a suction cup 34 movable into the cassette 18 with the lid 28 being open in one of the cassette loading regions 20a through 20d, and a feed roller pair 36 for receiving and feeding the stimulable phosphor sheet 22 attracted by the suction cup 34. A pinion 38 is mounted on the output shaft of a motor (not shown) mounted on the vertically movable base 32 and held in mesh with the vertically extending rack 40.

The image information reading apparatus 12 has an erasing unit (processing unit) 44 and a reading unit (processing unit) 46 disposed below the vertically movable sheet feeder 30 in the apparatus housing 12a and connected thereto by a feed system 42. The feed system 42 comprises a plurality of roller pairs 48 which jointly make up a vertical feed path extending downwardly from the vertically movable sheet feeder 30. The reading unit 46 is positioned near the lower end of the vertical feed path and connected thereto by a transverse sheet shifter 49. The reading unit 46 comprises an auxiliary scanning feeding mechanism 50 for delivering a stimulable phosphor sheet 22 from a cassette 18 in an auxiliary scanning direction indicated by the arrow A, an optical system 52 for applying a laser beam L as it is deflected in a main scanning direction (substantially perpendicular to the auxiliary scanning direction) to the stimulable phosphor sheet 22 as it is delivered in the auxiliary canning direction, and a light guiding system 54 for photoelectrically reading light which is emitted from the stimulable phosphor sheet 22 when the stimulable phosphor sheet 22 is exposed to the laser beam L. The reading unit 46 serves as a two-dimensional scanning unit.

The auxiliary scanning feeding mechanism 50 has first and second roller pairs 56, 58 rotatable in synchronism with each other. Each of the first and second roller pairs 56, 58 has a pair of rollers that can be moved toward and away from each other. The light guiding system 54 comprises a light guide 60 extending along a main scanning line on the stimulable phosphor sheet 22 where the laser beam L is applied, and a photomultiplier 62 mounted on an upper end of the light guide 60.

A sheet feeder 64 for upwardly feeding the stimulable phosphor sheet 22 from which radiation image information has been read by the reading unit 46 is disposed downstream of the reading unit 46 in the direction of travel of the stimulable phosphor sheet 22 through the reading unit 46. When the stimulable phosphor sheet 22 is fed from the reading unit 46 upwardly by the sheet feeder 64, the leading end of the stimulable phosphor sheet 22 is guided horizontally over a power supply 66 above the erasing unit 44 via an erasing unit feeder 68 disposed near the power supply 66. The erasing unit feeder 68 then feeds back the stimulable phosphor sheet 22, whose leading end has been fed over the power supply 66, horizontally from the left to the right into the erasing unit 44. The erasing unit 44 is disposed on one side of the feed path of the erasing unit feeder 68. The erasing unit 44 comprises a horizontal array of erasing light sources 70. The erasing unit feeder 68 extends horizontally through the erasing unit 44 and then upwardly obliquely, and is connected to the feed system 42.

Figure 2:
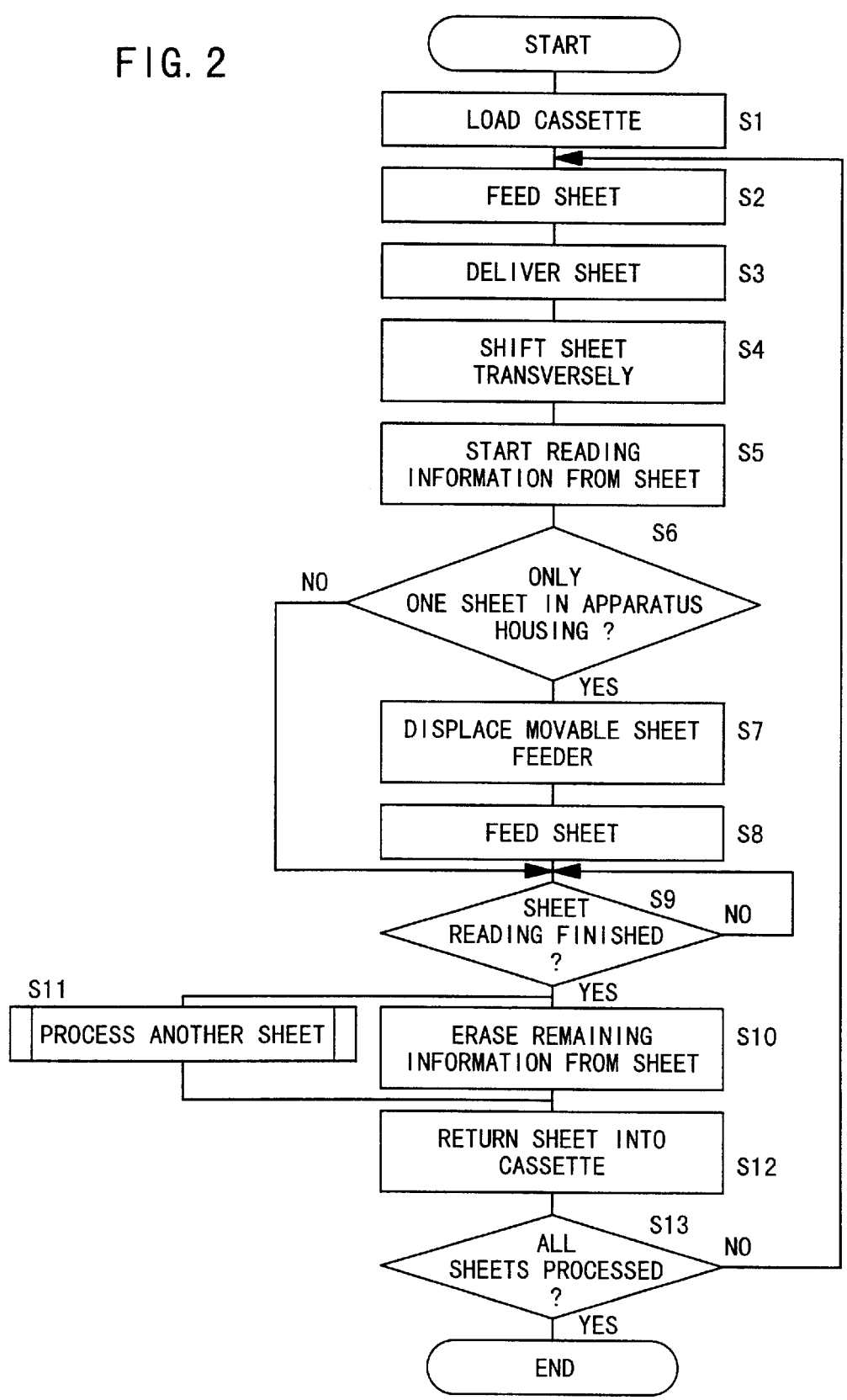
FIG. 2 is a flowchart of the method of handling a sheet-like member.

Operation of the image information reading apparatus 12 thus constructed will be described below with reference to a flowchart shown in FIG. 2.

A cassette 18 which stores a first stimulable phosphor sheet 22a which carries radiation image information of a subject such as a human body recorded by an exposure device (not shown) is introduced into the apparatus housing 12a along the cassette loading region 20a, for example. As the cassette 18 is introduced, the leading end of the cassette 18 pushes open a shutter 29, and enters the interior space of the apparatus housing 12a.

Figure 3:
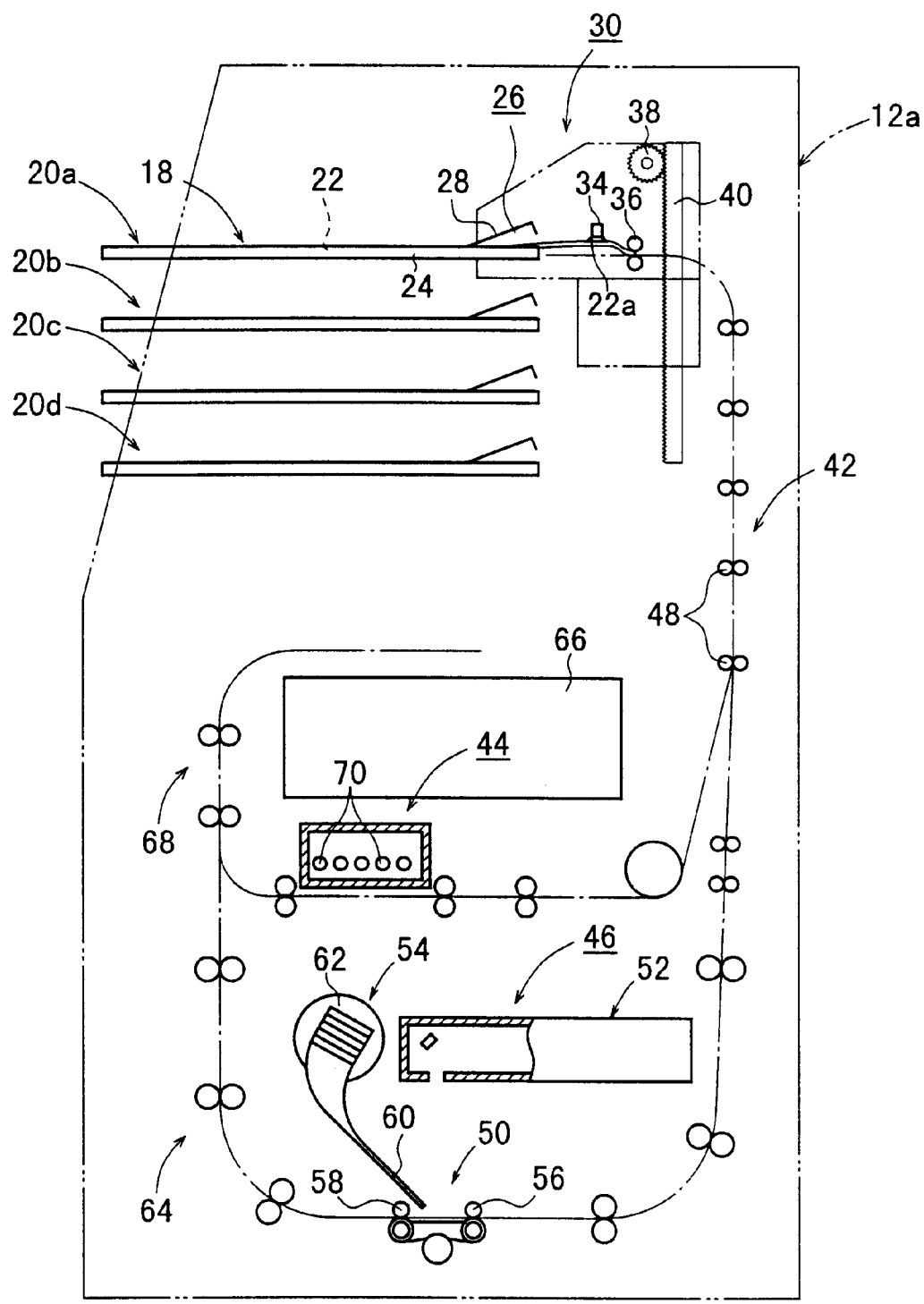
FIG. 3 is a schematic vertical cross-sectional view showing he manner in which a stimulable phosphor sheet is fed from a cassette in the image information reading apparatus.

After respective cassettes 18 have been inserted into the cassette loading regions 20a through 20d in step S1 (see FIG. 2), the vertically movable sheet feeder 30 is actuated to move the vertically movable base 32 into horizontal alignment with the cassette loading region 20a, for example. Then, as shown in FIG. 3, the first stimulable phosphor sheet 22a in the cassette 18 is attracted by the suction cup 34, and removed thereby from the cassette 18 out of the opening 26. Substantially at the same time that the leading end of the first stimulable phosphor sheet 22a is gripped by the feed roller pair 36, the first stimulable phosphor sheet 22a is released from the suction cup 34. The first stimulable phosphor sheet 22a is now fed from the cassette 18 in step S2.

The first stimulable phosphor sheet 22a is transferred from the feed roller pair 36 to the feed system 42, and then delivered downwardly by the roller pairs 48 of the feed system 42 in step S3. The first stimulable phosphor sheet 22a is then transversely shifted in a direction perpendicular to the direction along the feed system 42 by the transverse sheet shifter 49 immediately prior to the reading unit 46 in step S4.

In the reading unit 46, radiation image information recorded in the first stimulable phosphor sheet 22a starts being read in step S5. Specifically, while the first stimulable phosphor sheet 22a is being fed in the auxiliary scanning direction indicated by the arrow A by the first and second roller pairs 56, 58 of the auxiliary scanning feeding mechanism 50, the laser beam L emitted from the optical system 52 is applied to the recording surface of the first stimulable phosphor sheet 22a. Radiation image information stored in the first stimulable phosphor sheet 22a is now photoelectrically read by the light guiding system 54.

After the reading unit 46 has started to read the radiation image information stored in the first stimulable phosphor sheet 22a, it is determined in step S6 whether only one stimulable phosphor sheet 22, i.e., only the first stimulable phosphor sheet 22a, is present in the apparatus housing 12a or not. If only the first stimulable phosphor sheet 22a is present in the apparatus housing 12a (YES in step S6), then control goes to step S7 in which the vertically movable sheet feeder 30 is actuated to bring the vertically movable base 32 into alignment with the cassette loading region 20b, for example.

Figure 4:
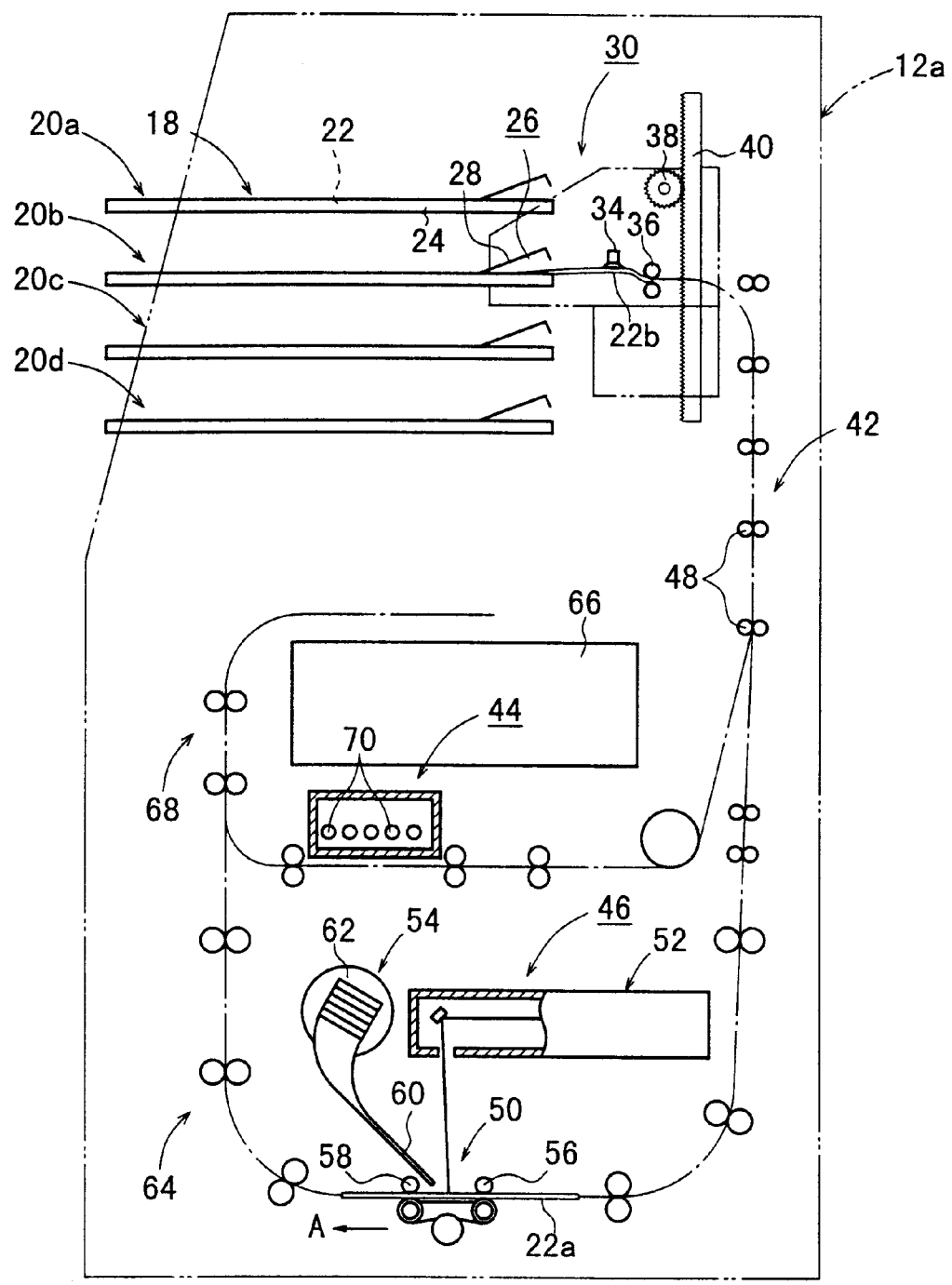
FIG. 4 is a schematic vertical cross-sectional view showing the manner in which a next stimulable phosphor sheet is fed from a cassette while recorded radiation image information is being read from the preceding stimulable phosphor sheet by a reading unit in the image information reading apparatus.

As shown in FIG. 4, in the cassette loading region 20b, the second stimulable phosphor sheet 22b in the cassette 18 is attracted by the suction cup 34, and removed thereby from the cassette 18. The leading end of the second stimulable phosphor sheet 22b is gripped by the feed roller pair 36 in step S8.

When the process of reading the radiation image information from the first stimulable phosphor sheet 22a with the reading unit 46 is finished (YES in step S9), control goes to step S10 and step S11. Specifically, the first stimulable phosphor sheet 22a is delivered upwardly by the sheet feeder 64 until the leading end of the first stimulable phosphor sheet 22a is guided horizontally above the power supply 66. Thereafter, the first stimulable phosphor sheet 22a is transferred backwards from the sheet feeder 64 to the erasing unit feeder 68. The erasing sheet feeder 68 feeds the first stimulable phosphor sheet 22a horizontally to the erasing unit 44 with its trailing end as fed by the sheet feeder 64 serving as the leading end.

The erasing unit 44 erases remaining radiation image information from the first stimulable phosphor sheet 22a with illuminating light emitted from the erasing light sources 70 in step S10. Thereafter, the first stimulable phosphor sheet 22a is fed to the feed system 42, and then fed upwardly by the feed system 42, after which the first stimulable phosphor sheet 22a is sent back into the empty cassette 18 in the cassette loading region 20a by the vertically movable sheet feeder 30 in step S12.

In step S11, the second stimulable phosphor sheet 22b fed by the vertically movable sheet feeder 30 is processed. Specifically, radiation image information stored in the second stimulable phosphor sheet 22b starts being read by the reading unit 46 in steps S3–S5.

Figure 5:
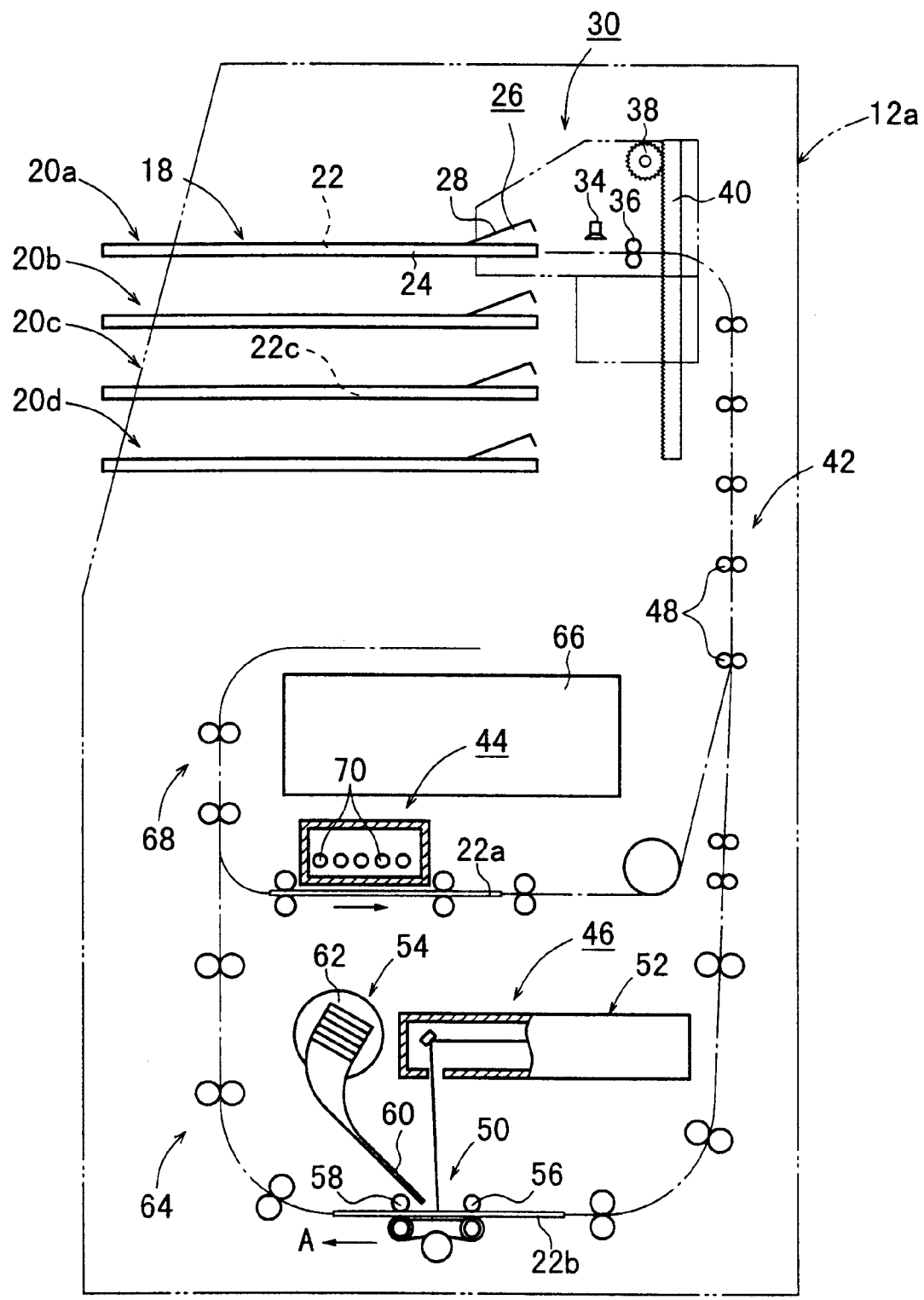
FIG. 5 is a schematic vertical cross-sectional view showing the manner in which recorded radiation image information is being read from the next stimulable phosphor sheet by the reading unit while the preceding stimulable phosphor sheet is being fed into an erasing unit in the image information reading apparatus.

In step S6, since two stimulable phosphor sheets 22, i.e., the first and second stimulable phosphor sheets 22a, 22b, are judged as being present in the apparatus housing 12a (NO in step S6), control goes to steps S9, S10. The radiation image information stored in the second stimulable phosphor sheet 22b is read and remaining radiation image information is erased from the second stimulable phosphor sheet 22b. At this time, in the apparatus housing 12a, as shown in FIG. 5, the remaining radiation image information is erased from the first stimulable phosphor sheet 22a, and the radiation image information is read from the second stimulable phosphor sheet 22b.

After the second stimulable phosphor sheet 22b is returned turned to the cassette 18 in the cassette loading region 20b, if it is determined that all the stimulable phosphor sheets have been processed (YES in step S13), then the image information reading apparatus 12 is de-energized.

In the illustrated embodiment, when the reading unit 46 starts reading the radiation image information from the first stimulable phosphor sheet 22a which has been removed from the cassette loading region 20a, the vertically movable sheet feeder 30 is actuated to move the vertically movable base 32 into alignment with the cassette loading region 20b, for example. The suction cup 34 is actuated to attract the second stimulable phosphor sheet 22b in the cassette 18 in the cassette loading region 20b, and feed the second stimulable phosphor sheet 22b so that its leading end is gripped by the feed roller pair 36. Consequently, substantially at the same time that the reading unit 46 has just finished reading the radiation image information from the first stimulable phosphor sheet 22a, the second stimulable phosphor sheet 22b held by the vertically movable sheet feeder 30 is delivered into the feed system 42, which feeds the second stimulable phosphor sheet 22b to the reading unit 46.

Therefore, immediately after the process of reading the radiation image information from the first stimulable phosphor sheet 22a, the process of reading the radiation image information from the second stimulable phosphor sheet 22b can quickly be started. As a result, the image information reading apparatus 12 has an increased sheet processing capability per unit time. Usually, two stimulable phosphor sheets 22 are present for processing in the apparatus housing 12a (see FIGS. 4 and 5), and hence can be processed highly efficiently.

The image information reading apparatus 12 according to the illustrated embodiment is particularly effective in simultaneously processing stimulable phosphor sheets 22 of different dimensions, e.g., the first stimulable phosphor sheet 22a which may be shorter and the second stimulable phosphor sheet 22b which may be longer. Specifically, while the radiation image information is being read from the second stimulable phosphor sheet 22b, the first stimulable phosphor sheet 22a from which the remaining radiation image information has been erased is returned by the vertically movable sheet feeder 30 into the cassette 18 in the cassette loading region 20a. Then, the vertically movable sheet feeder 30 is displaced into alignment with the cassette loading region 20c, and feeds the third stimulable phosphor sheet 22c from the cassette 18 in the cassette loading region 20c so that its leading end is gripped by the feed roller pair 36.

Therefore, right after the longer second stimulable phosphor sheet 22b has been read, the third stimulable phosphor sheet 22c (see FIG. 5) is immediately delivered into the feed system 42, so that the reading unit 46 can quickly read stored radiation image information from the third stimulable phosphor sheet 22c.

While the stimulable phosphor sheets 22 (22a–22c) have been described as sheet-like members in the illustrated embodiment, various image recording carriers or mediums such as photographic photosensitive films may be employed in the image information reading apparatus 12, and a recording unit for recording images on such photographic photosensitive films may be employed as a processing unit.

In the sheet-like member apparatus and the method of processing a sheet-like member according to the present invention, while a first sheet-like member delivered from a cassette is being processed by a processing unit, the movable sheet feeder is displaced into another cassette and removes a second sheet-like member from the other cassette. Therefore, immediately after the processing of the first sheet-like member with the processing unit is finished, the second sheet-like member can quickly be fed into the processing unit. As a result, sheet-like members stored in respective cassettes in the cassette loading regions do not need to wait for processing over an unduly long period time, and the sheet-like member processing apparatus has an increased sheet processing capability per unit time.

Although a certain preferred embodiment of the present invention has been shown and described in detail, it should be understood that various changes and modifications may be made therein without departing from the scope of the appended claims.

What is claimed is:

1. A sheet-like member processing apparatus comprising:
   a plurality of loading regions which loads respective cassettes containing sheet-like members therein;
   a single movable sheet feeder which removes a first sheet-like member from one of the cassettes loaded in said loading regions;
   a processor which processes the sheet-like member removed from said cassette; and
   a controller which positions said movable sheet feeder in alignment with another one of the cassettes and controls said movable sheet feeder to remove a second sheet-like member from said other one of the cassettes while the first sheet-like member is being processed by said processor, and feeds said second sheet-like member to said processor after the first sheet-like member has been processed by said processor.

2. A sheet-like member processing apparatus according to claim 1, wherein each of said sheet-like members comprises a stimulable phosphor sheet, said processor comprising a two-dimensional scanning unit for photoelectrically reading radiation image information recorded in said stimulable phosphor sheet.

3. A method of handling a sheet-like member in a sheet-like member processing apparatus having a plurality of loading regions for loading respective cassettes containing sheet-like members therein, a single movable sheet feeder for removing the sheet-like member from one of the cassettes loaded in said loading regions, and a processor for processing the sheet-like member removed from said cassette, said method comprising the steps of:

removing a first sheet-like member from one of the cassettes loaded in said loading regions;

feeding the removed first sheet-like member to said processor;

positioning said movable sheet feeder in alignment with another one of the cassettes and removing a second sheet-like member from said other one of the cassettes while the first sheet-like member is being processed by said processor; and feeding said second sheet-like member to said processor after the first sheet-like member has been processed by said processor.

4. A method according to claim 3, wherein said movable sheet feeder comprises a suction cup and a feed roller pair, said method further comprising the steps of:

attracting and removing said second sheet-like member from said other one of the cassettes using said suction cup after the first sheet-like member has started to be processed by said processor; and gripping a leading end of said second sheet-like member removed by said suction cup using said feed roller pair.

5. A method according to claim 3, wherein if there is another sheet-like member present in said sheet-like member processing apparatus while the first sheet-like member is being processed by said processor, then said other sheet-like member is placed in one of said cassettes, and thereafter said second sheet-like member is removed from said other one of the cassettes by said movable sheet feeder.

6. A method according to claim 3, wherein each of said sheet-like members comprises a stimulable phosphor sheet, said processor comprising a two-dimensional scanning unit for photoelectrically reading radiation image information recorded in said stimulable phosphor sheet.

7. A sheet-like member processing apparatus comprising:

a plurality of loading regions which loads respective cassettes containing sheet-like members therein;

a single movable sheet feeder which removes a first sheet-like member from one of the cassettes loaded in said loading regions;

a processor which processes the sheet-like member removed from said cassette; and means for controlling said movable sheet feeder such that it is positioned in alignment with another one of the cassettes, said control means for controlling said movable sheet feeder to remove a second sheet-like member from said other one of the cassettes while the first sheet-like member is being processed by said processor, and for feeding said second sheet-like member to said processor after the first sheet-like member has been processed by said processor.

* * * * *